United States Patent
Tsai et al.

(10) Patent No.: US 10,084,352 B2
(45) Date of Patent: Sep. 25, 2018

(54) THIN AXIAL GAP MOTOR

(71) Applicant: COOLER MASTER CO., LTD., New Taipei (TW)

(72) Inventors: Shui-Fa Tsai, New Taipei (TW); Shih-Wei Huang, New Taipei (TW); Chu-Yi Kuo, New Taipei (TW)

(73) Assignee: COOLER MASTER CO., LTD., New Taipei (TW)

(*) Notice: Subject to any disclaimer, the term of this patent is extended or adjusted under 35 U.S.C. 154(b) by 283 days.

(21) Appl. No.: 14/580,413

(22) Filed: Dec. 23, 2014

(65) Prior Publication Data

US 2015/0244213 A1   Aug. 27, 2015

(30) Foreign Application Priority Data

Feb. 27, 2014  (CN) .................. 2014 2 0087080 U

(51) Int. Cl.
| | |
|---|---|
| *H02K 1/14* | (2006.01) |
| *H02K 21/24* | (2006.01) |
| *H02K 7/08* | (2006.01) |
| *H02K 1/27* | (2006.01) |
| *H02K 11/33* | (2016.01) |
| *H02K 7/09* | (2006.01) |

(52) U.S. Cl.
CPC ............ *H02K 1/143* (2013.01); *H02K 1/141* (2013.01); *H02K 1/146* (2013.01); *H02K 1/2793* (2013.01); *H02K 7/086* (2013.01); *H02K 11/33* (2016.01); *H02K 21/24* (2013.01); *H02K 7/09* (2013.01)

(58) Field of Classification Search
CPC ........ H02K 21/24; H02K 1/141; H02K 1/146; H02K 11/33; H02K 1/143; H02K 1/2793; H02K 7/086
USPC .......................................................... 310/268
See application file for complete search history.

(56) References Cited

U.S. PATENT DOCUMENTS

| | | | | |
|---|---|---|---|---|
| 4,228,378 A | * | 10/1980 | Humbert .................. | H02K 1/26 310/268 |
| 4,318,017 A | * | 3/1982 | Migeon ................ | H02K 1/2793 310/156.16 |
| 4,370,578 A | * | 1/1983 | Tilse ...................... | H02K 1/143 29/525 |

(Continued)

FOREIGN PATENT DOCUMENTS

TW           201103234 A      1/2011

*Primary Examiner* — Naishadh Desai
(74) *Attorney, Agent, or Firm* — Muncy, Geissler, Olds & Lowe, P.C.

(57) ABSTRACT

A thin axial gap motor includes: a base, a circuit unit installed on the base; a stator module including at least one flat permeable frame and at least one winding, and the permeable frame having at least one support arm and an induced magnetic part connected to the at least one support arm, and the winding being wound around the support arm; a rotor module including a flat permanent magnet installed at the top of the induced magnetic parts and having an orthographic projection range corresponsive to the area of the induced magnetic part, and the at least one winding being disposed on an outer side of the permanent magnet; and a pivoting element installed between the base and the rotor module and including a bearing housing and a spindle plugged into the bearing housing for rotating the rotor module with respect to the base.

10 Claims, 18 Drawing Sheets

(56) References Cited

U.S. PATENT DOCUMENTS

| | | | | |
|---|---|---|---|---|
| 6,198,182 | B1* | 3/2001 | Bustamante | H02K 7/116 |
| | | | | 310/268 |
| 6,664,689 | B2* | 12/2003 | Rose | H02K 21/12 |
| | | | | 310/156.32 |
| 2002/0145351 | A1* | 10/2002 | Horng | F04D 25/0653 |
| | | | | 310/114 |
| 2005/0001509 | A1* | 1/2005 | Gandel | H02K 37/125 |
| | | | | 310/268 |
| 2006/0267448 | A1* | 11/2006 | Yuba | H02K 26/00 |
| | | | | 310/268 |
| 2011/0133596 | A1* | 6/2011 | Asano | H02K 1/2793 |
| | | | | 310/268 |
| 2012/0104880 | A1* | 5/2012 | Takemoto | H02K 21/24 |
| | | | | 310/44 |

* cited by examiner

THIN AXIAL GAP MOTOR

FIELD OF THE INVENTION

The present invention relates to a motor, and more particularly to a thin motor with an axial gap design.

BACKGROUND OF THE INVENTION

Electric motor (also known as motor or electric machine) is an electric device capable of converting electric energy into mechanical energy, and using the mechanical energy to generate kinetic energy to drive other devices. Most electric motors generate energy in an electric machine through magnetic field and winding current. Electric motors have been used extensively in many fields for supplying power.

Since electronic products tend to be designed with an increasingly smaller thickness, the thickness of the motor becomes smaller and smaller. For example, a fan motor applied for dissipating heat is generally installed in an electronic product such as a desktop computer, a notebook computer, and a tablet PC for dissipating the heat generated by the electronic component. In another example, a small pump is applied for driving a liquid coolant in a heat dissipating structure of a heat pipe.

To minimize the thickness of the motor, a motor assembly of a flexible circuit board coil (FP Coil) as disclosed in R.O.C. Pat. Publication No. TW201103234 entitled "Motor stator and coil set thereof" relates to an assembly comprising a plurality of silicon steel plates stacked with one another in order to overcome the difficulty of reducing the total axial height of the motor. However, such assembly requires a manufacturing process of combining a circuit board, and both of the manufacturing process and the assembly are complicated, and thus the cost is high.

In view of the aforementioned drawbacks of the prior art, the inventor of the present invention based on years of experience in the related industry to conduct extensive researches and experiments, and finally designed a feasible solution to overcome the drawbacks of the prior art.

SUMMARY OF THE INVENTION

Therefore, it is a primary objective of the present invention to provide a thin axial gap motor with an adjustable design of the stator module to reduce the total height of the motor, and the smaller height is conducive to the design of a thin motor.

To achieve the aforementioned and other objectives, the present invention provides a thin axial gap motor comprising: a base; a circuit unit, installed on the base; a stator module, including at least one flat permeable frame and at least one winding, and the permeable frame having at least one support arm and an induced magnetic part coupled to the at least one support arm, and the winding being wound around the support arm; a rotor module, including a flat permanent magnet installed at the top of the plurality of induced magnetic parts, and the permanent magnet having an orthographic projection range corresponsive to the area of the induced magnetic part, and the at least one winding being situated on an external side of the permanent magnet; and a pivoting element, installed between the base and the rotor module, and including a bearing housing and a spindle plugged into the bearing housing for rotating the rotor module with respect to the base.

In the thin axial gap motor, the support arm of each permeable frame includes an external arm part and a connecting arm part, and the connecting arm part is coupled to the external arm part and the induced magnetic part.

In the thin axial gap motor, the support arm is substantially U-shaped and includes an external arm part, and a pair of connecting arm parts, and one of the ends of each connecting arm part is coupled to both ends of the external arm part, and the other end of each connecting arm part is coupled to one of the induced magnetic parts.

In the thin axial gap motor, each external arm part has a winding wound around the external arm part, and the plurality of induced magnetic parts are arranged into a circular ring shape, and each permanent magnet is in a circular ring shape.

In the thin axial gap motor, the winding is wound around each respective connecting arm part, and the plurality of induced magnetic parts are arranged into a circular ring shape, and each permanent magnet is in a circular ring shape.

In the thin axial gap motor, the bearing housing is fixed to the center of the permanent magnet, and the base has an axial hole formed thereon, and the bottom of the spindle is soldered and fixed to the axial hole, and the bearing housing is installed upside down and sheathed on the spindle.

In the thin axial gap motor, the circuit unit includes a circuit board, and at least one electronic component installed on the circuit board, and the stator module is installed on the circuit board of the circuit unit, and the circuit board has a wire containing hole formed thereon for receiving a part of the winding.

In the thin axial gap motor, the base has an opening formed thereon and configured to be corresponsive to the wire containing hole, and a part of the winding is disposed in the opening.

In the thin axial gap motor, the stator module includes a plurality of induced magnetic parts arranged into a circular ring shape, and a separating groove is formed between two of the adjacent induced magnetic parts, and an included angle is defined between the plurality of separating grooves and the diameter of the spindle.

In the thin axial gap motor, the stator module includes a plurality of induced magnetic parts arranged into a circular ring shape, and a magnetic field changing part is formed on a surface of each induced magnetic part.

In the thin axial gap motor, the magnetic field changing part is formed by bending an edge of the induced magnetic part upwardly.

In the thin axial gap motor, the magnetic field changing part is formed by punching the top of the induced magnetic part upwardly.

The present invention has the following advantages and effects: The stator module and the rotor module are installed in a direction parallel to the spindle to form an axial gap structure. In addition, the winding is moved to the outer side of the permanent magnet to reduce the height occupied by the winding or the height occupied by the circuit board, and such arrangement is conducive to the manufacture of a thin motor.

DESCRIPTION OF THE PREFERRED EMBODIMENTS

Figure 1:
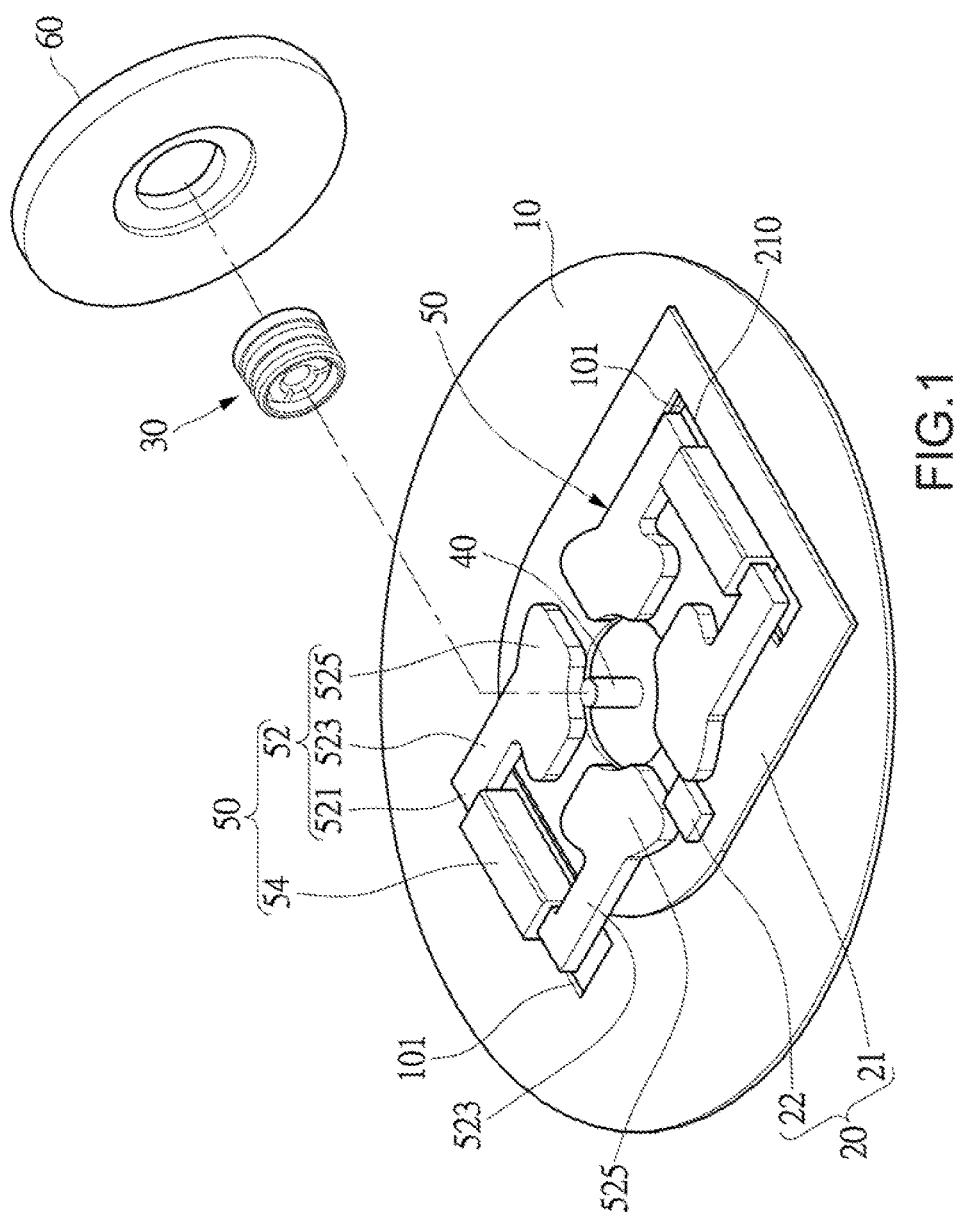
FIG. 1 is an exploded view of a thin axial gap motor in accordance with a first preferred embodiment of the present invention.

The technical contents of the present invention will become apparent with the detailed description of preferred embodiments accompanied with the illustration of related drawings as follows. It is noteworthy that same numerals are used for representing same respective elements in the drawings.

First Preferred Embodiment

Figure 2:
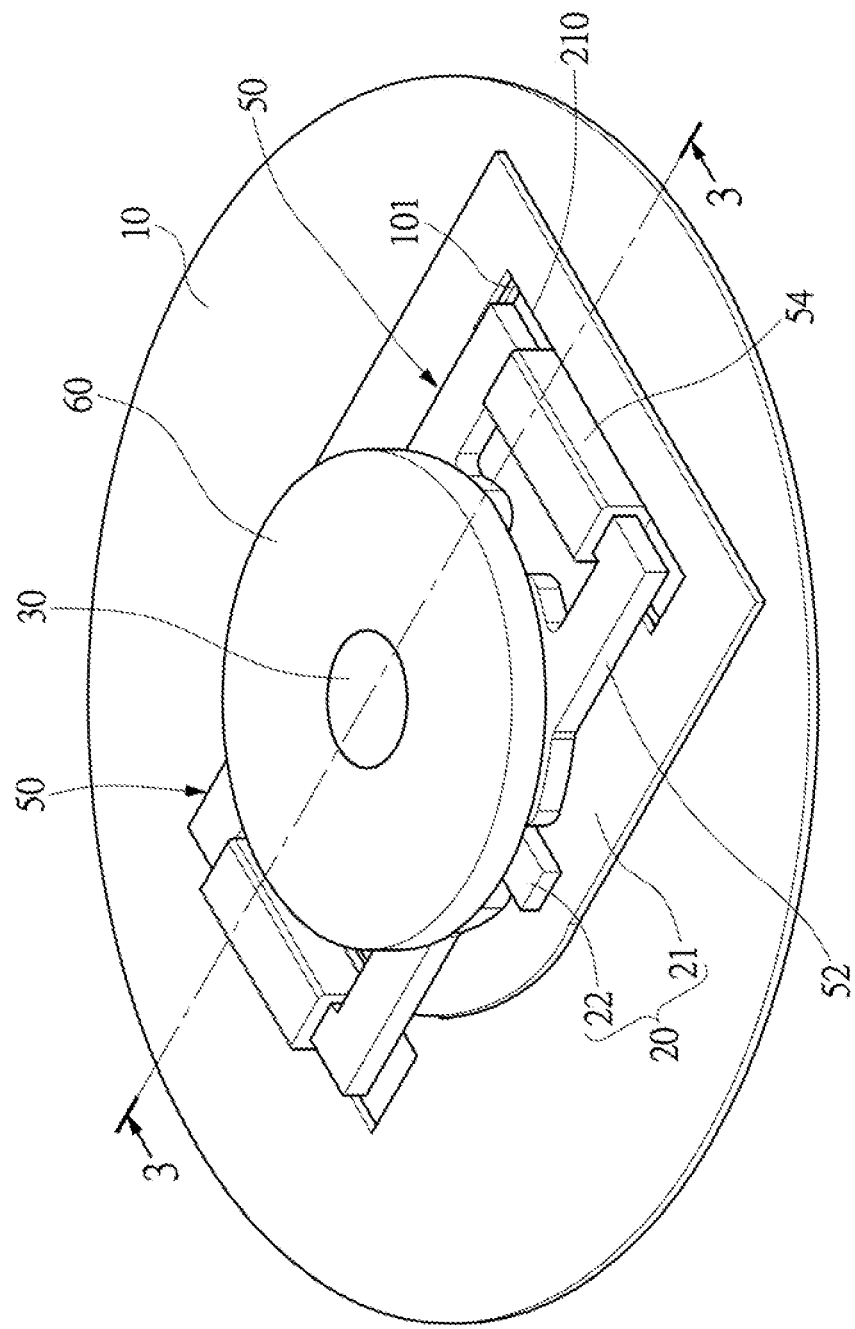
FIG. 2 is a perspective view of a thin axial gap motor in accordance with the first preferred embodiment of the present invention.

With reference to FIGS. 1 and 2 for the exploded view and the perspective view of a thin axial gap motor in accordance with the present invention respectively, the thin axial gap motor (hereinafter referred to as "axial gap motor") comprises a base 10, a circuit unit 20, a bearing housing 30, a spindle 40, a stator module 50 and a rotor module. The design of the present invention is applied to motors, pumps, fans, etc., particularly to any electronic component that requires a small thickness.

In this preferred embodiment, the base 10 is simply represented by a circular board, primarily serving as a part of a motor casing, and the base 10 may be a metal board or a plastic board.

The circuit unit 20 is installed on the base 10. The circuit unit 20 includes a circuit board 21, and at least one electronic component 22 installed on the circuit board 21.

Figure 3:
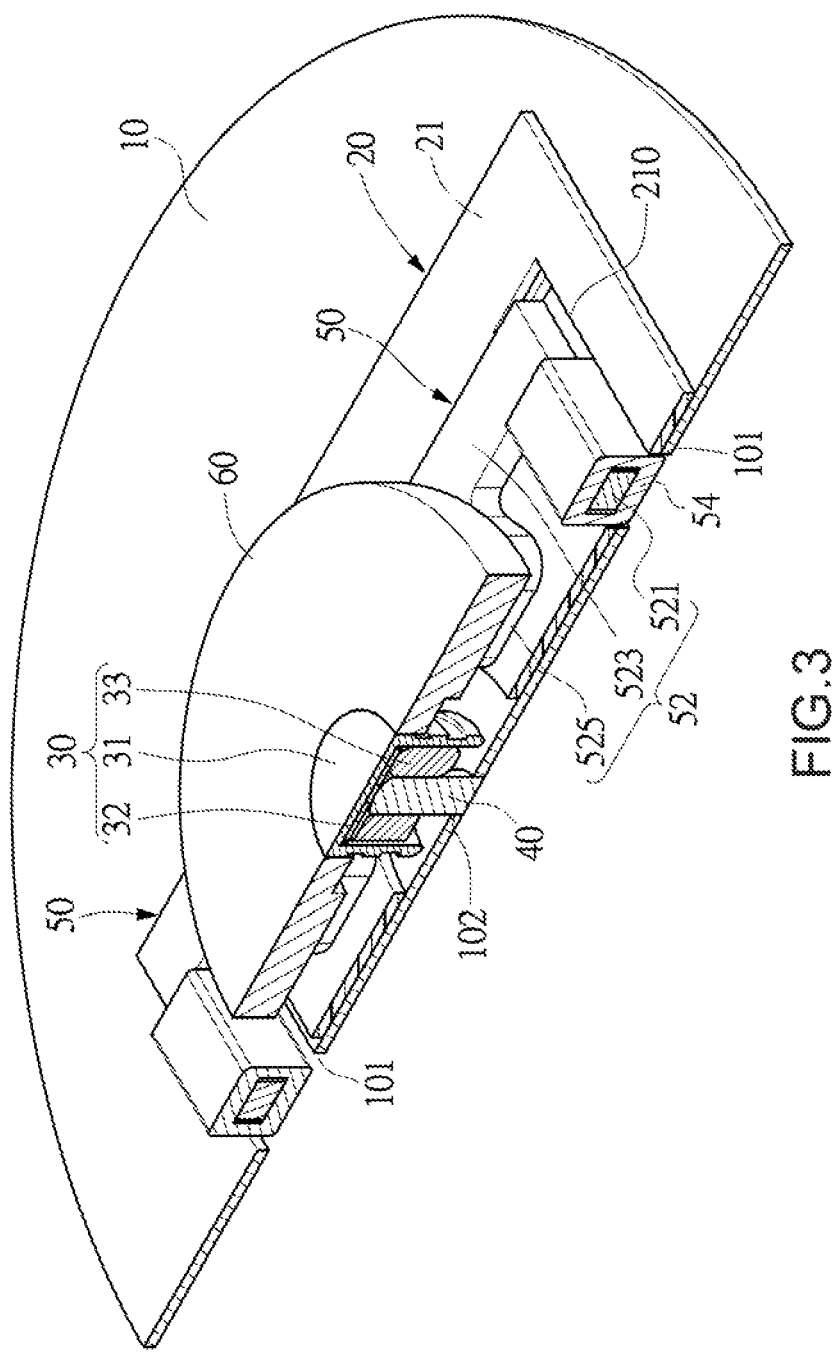
FIG. 3 is a perspective sectional view of Section 3-3 of FIG. 2.

In this preferred embodiment, the spindle 40 is vertically fixed to the base 10, and the bottom of the spindle 40 is fixed to an axial hole 102 of the base 10 (as shown in FIG. 3). Preferably, the spindle 40 is fixed to the axial hole 102 by soldering, and a bearing housing 30 is installed upside down and sheathed on the spindle 40 in order to reduce the total height of the motor. In this preferred embodiment, the rotor module comprises the bearing housing 30, and a permanent magnet 60 fixed to the top of the bearing housing 30. In addition, other components may be installed according to the requirements of the motor. For example, a hub may be added to the permanent magnet 60, and fan vanes may be added to the periphery of the hub to form a fan or a pump. The bearing housing 30 is sheathed on the spindle 40.

However, the way of fixing the spindle 40 of the present invention is not limited to the aforementioned arrangement only, but other designs may be adopted as well. For example, the spindle 40 may be fixed to the center of a cup-shaped socket (not shown in the figure) first, and the bottom of the spindle 40 may be fixed to a center hole of the socket by soldering, and then the socket is fixed to a socket opening (not shown in the figure) of the base 10.

It is noteworthy that the present invention is not limited to the motor with the upside-down spindle (or the bearing housing 30 installed upside down and sheathed on the spindle 40) only. The bearing housing 30 and the spindle 40 may be considered as an axial pivoting module provided for rotating the rotor module with respect to the base 10. The pivoting element may be installed forwardly or reversely between the base 10 and the rotor module. For example, the spindle 40 may be forwardly installed, wherein the top of the spindle 40 is fixed to the center of the permanent magnet 60 or hub (not shown in the figure), and the bearing housing 30 is installed reversely on the base 10, and the bottom of the spindle 40 is plugged into the bearing housing 30, so that the rotor module may be rotated with respect to the base 10. In this preferred embodiment, the permanent magnet 60 and the spindle 40 may be considered as a rotor module. In other words, the present invention may have a pivoting element forwardly or reversely installed between the rotor module and the base 10 for rotating the rotor module with respect to the base 10.

One of the technical characteristics of the present invention is to change the structure of the stator module 50, and the stator module 50 is a flat structure. In addition, the winding 54 is moved outwardly to the outside of the permanent magnet 60, so as to reduce the total height of the motor. In addition, the permanent magnet 60 is also a flat structure (which is a circular disk in this preferred embodiment) installed to the top of the stator module 50 and in an axial direction of the spindle 40 to form an axial gap structure. In other words, an air gap is formed between the stator module 50 and the rotor module and provided for rotating the rotor module freely in the direction of the spindle 40.

In this preferred embodiment, the stator module 50 includes a pair of flat permeable frames 52 and a pair of windings 54. Each permeable frame 52 includes a U-shaped support arm and an induced magnetic part 525 disposed at an end of the support arm, and the winding 54 is wound around the support arm. In this preferred embodiment, the U-shaped support arm includes an external arm part 521, and a pair of connecting arm parts 523 coupled to both ends of the external arm part 521 respectively, and the other end of each connecting arm part 523 is coupled to an induced magnetic part 525. The permanent magnet 60 has an orthographic projection range corresponsive to the area of the induced magnetic part 525. In the present invention, the support arm of the permeable frame 52 is not limited to the aforementioned shape only, but other shapes, such as I-shape, T-shape, or any other shape capable of winding the windings 54 around the outside of the permanent magnet 60 may be adopted as well. The support arm includes an external arm part and a connecting arm part coupled to the external arm part and the induced magnetic part.

In this preferred embodiment, both of the external arm part 521 and the connecting arm part 523 are substantially in a linear shape, and each permeable frame 52 includes a winding 54 wound around the external arm part 521, and the pair of connecting arm parts 523 are coupled to both ends of the external arm part 521 respectively, and the other end of each connecting arm part 523 is coupled to an induced magnetic part 525. The plurality of induced magnetic parts 523 are preferably in a shape corresponsive to the permanent magnet 60 and arranged into a circular ring shape corresponsive to the circular ring shape of the permanent magnet 60. Wherein, the permeable frame 52 may be made of silicon steel plates stacked with one another or integrally-formed magnetically induced metal powder.

The winding 54 is comprised of combining at least one insulating bearing seat and at least one coil (not shown in the figure). In this preferred embodiment, the winding 54 is disposed at an outer side of the permanent magnet 60, so that the permanent magnet 60 is closer to the base 10 to further reduce the total height of the motor.

The stator module 50 of the present invention is a 4-slot 4-pole stator module comprising two sets of permeable frames 52 and windings 54. However, the invention is not limited to this preferred embodiment only, but other designs may be adopted as well. For example, a U-shaped permeable frame 52 and at least one winding 54 may be adopted, wherein the permeable frame 52 has two hemispherical induced magnetic parts engaged with each other to form a 1-phase 2-slot 2-pole module, or other arrangements such as 3-phase 3-slot 2-pole, or 6-slot 4-pole, and 6-slot 8-pole modules, etc. In short, the stator module 50 may include at least one support arm, a plurality of induced magnetic parts 525, 527, 529 coupled to the at least one support arm, and at least one winding 54, 54a, 54b, 54c, 54d, 54e wound around the at least one support arm, and the induced magnetic parts are wound around the periphery of the spindle 40.

The permanent magnet 60 of the rotor module is in a circular ring shape and installed at the top of the plurality of induced magnetic parts 523 to produce an axial air gap, wherein the winding 54 is disposed at an outer side of the permanent magnet 60. The winding 54 after being powered up produces excitations, and the magnetic field is distributed around an arc induced magnetic part 523 to produce attraction or repulsion with the axial permanent magnet 60 in order to rotate the rotor module. In this preferred embodiment, the induced magnetic part 523 may be covered by the magnetic field of the permanent magnet 60 to prevent affecting other components of an electronic device. Compared with the conventional, this preferred embodiment of the present invention no longer requires the use or installation of back iron.

Figure 4:
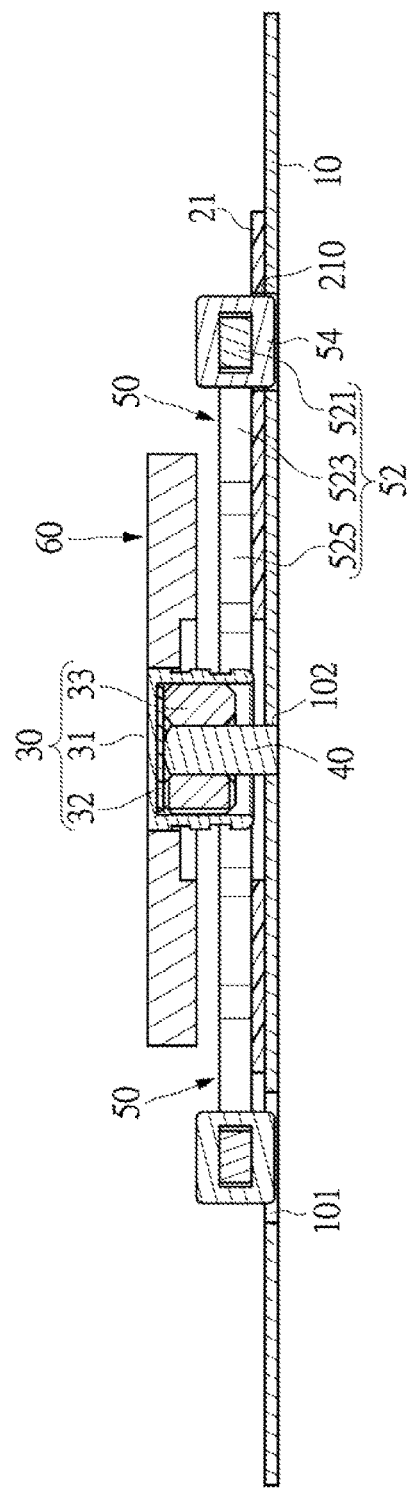
FIG. 4 is a planar view of FIG. 3.

With reference to FIGS. 2, 3 and 4 for a perspective view of the present invention, and a perspective sectional view of Section 3-3 of FIG. 2, and a planar view of FIG. 3 respectively, the bearing housing 30 includes a shaft tube 31, a spacer 32 installed at the top of an inner side of the shaft tube 31, and a bearing 33. The spindle 40 has an end (bottom end) soldered to the base 10, and the other end (top end) abutting the spacer 32. A spindle with such structural arrangement is called an upside-down spindle, and the total height of the motor is equal to the sum of the height of the spindle 40, the thickness of the spacer 32 and the thickness of a top wall of the shaft tube 31. In this preferred embodiment, the thickness of the motor is reduced.

In this preferred embodiment, the stator module 50 is installed on the circuit board 21 of the circuit unit 20 to further reduce the height of the motor, and the circuit board 21 of the circuit unit 20 has a wire containing hole 210 formed thereon and provided for accommodating a part of the winding 54. In addition, the base 10 further includes an opening 101 formed thereon and configured to be corresponsive to the wire containing hole 210, and a part of the winding 54 is disposed in the opening 101.

Figure 5:
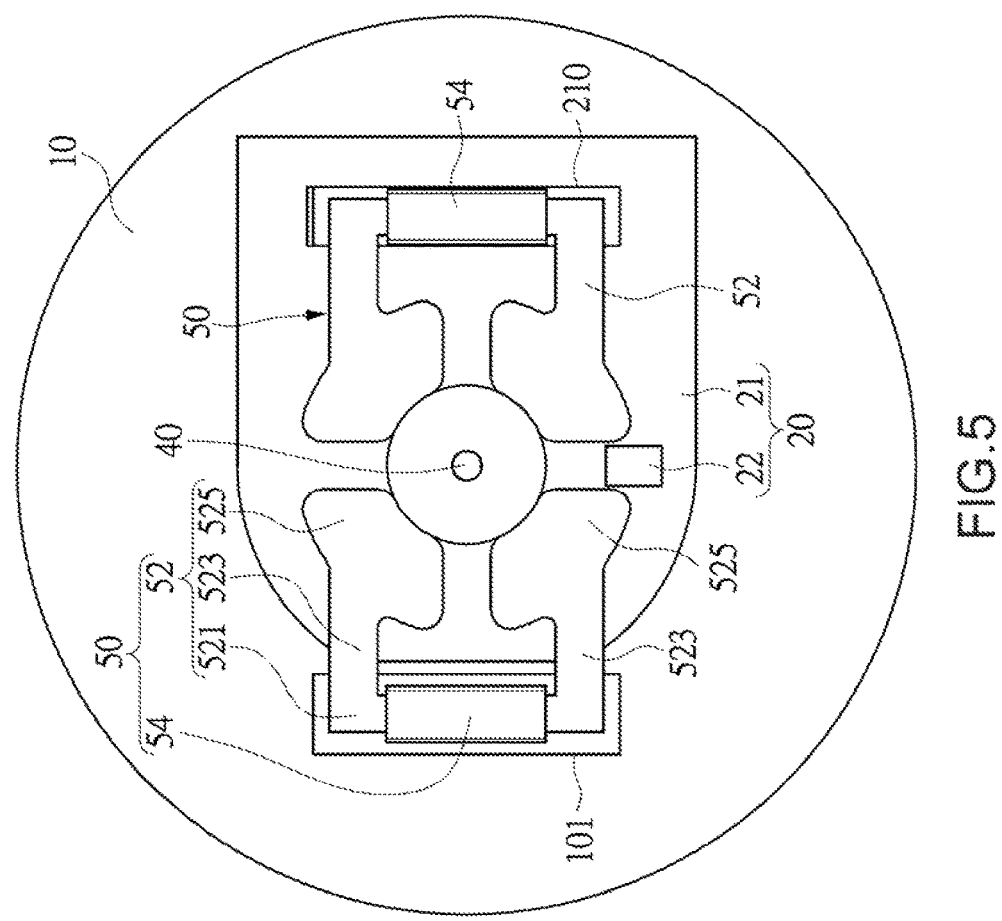
FIG. 5 is a top view of a stator motor in accordance with the first preferred embodiment of the present invention.

With reference to FIG. 5 for a schematic view of a stator motor with the permanent magnet removed as depicted in FIG. 2, the stator module of this preferred embodiment is considered as a 4-slot 4-pole module, and the electronic component 22 of the circuit unit 20 is installed at a separating groove between the induced magnetic parts 525, wherein the electronic component 22 includes but not limited to a control device for controlling a change of magnetism of the induced magnetic parts 525, and a sensing device such as a Hall element for sending the permanent magnet 60. In this preferred embodiment, the winding 54 is moved to the outer side of the permanent magnet 60. Compared with the conventional "※" shaped silicon steel plates with the winding 54, this preferred embodiment reduces the height occupied by the winding, the remaining induced magnetic part and the permanent magnet, and the gap between the remaining induced magnetic part and the permanent magnet to provide a thin design of the motor.

To fix the permeable frames 52 and the winding 54 of the stator module 50 onto the base 10, a fixing method such as riveting, embedding, soldering or locking may be used if the base 10 is made of metal, or a fixing method such as hot-melting or embedded injection may be used if the base 10 is made of plastic.

The following embodiments are provided for illustrating various types of stator modules of the present invention.

Second Preferred Embodiment

Figure 6:
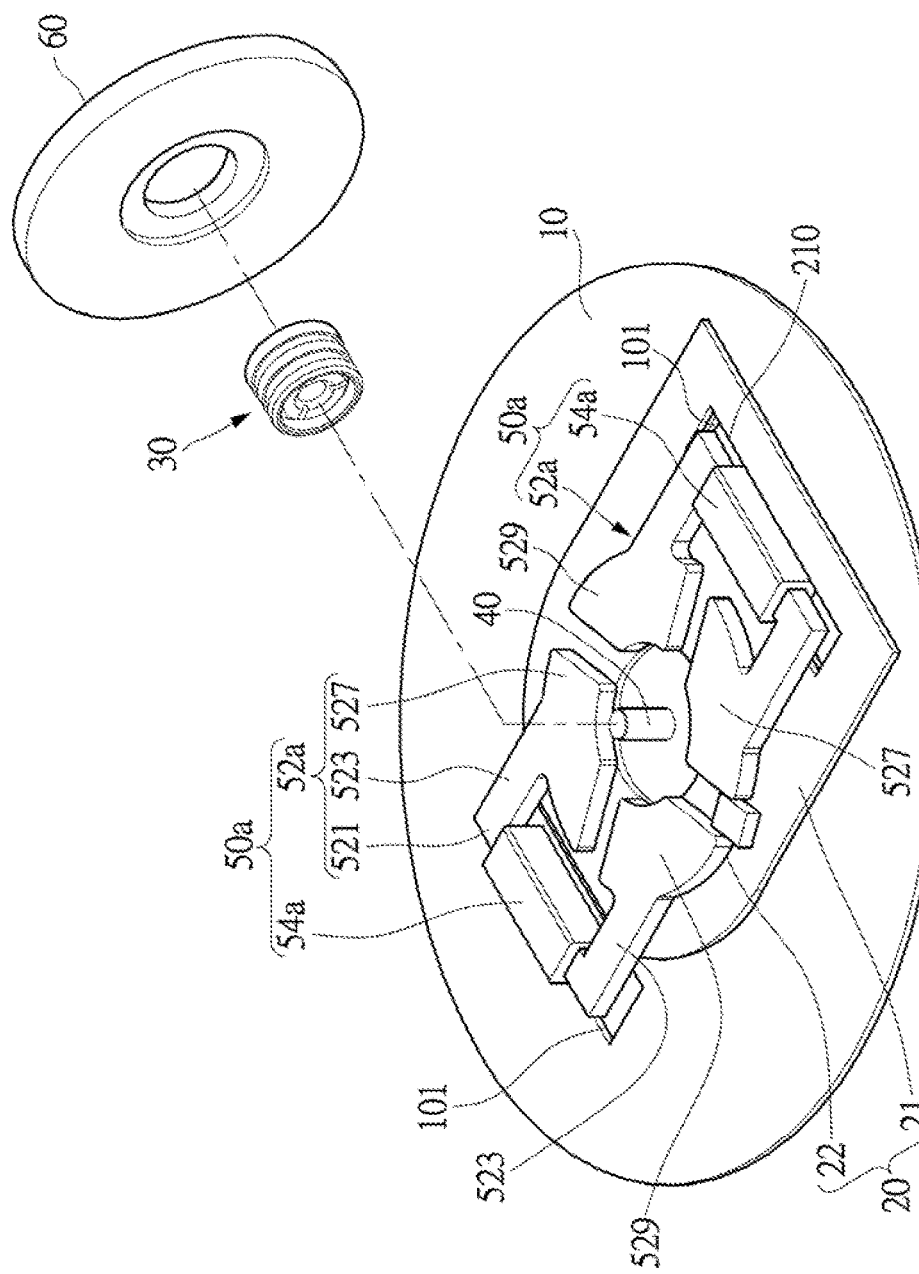
FIG. 6 is an exploded view of a thin axial gap motor in accordance with a second preferred embodiment of the present invention.

With reference to FIG. 6 for a perspective exploded view of a thin axial gap motor in accordance with the second preferred embodiment of the present invention, the stator module 50a of this preferred embodiment is also comprised of two symmetrical permeable frames 52a and two symmetrical windings 54a to provide a 4-slot 4-pole arrangement. Each permeable frame 52a includes two substantially straight external arm parts 521 installed opposite to each other, and a winding 54a wound around each external arm part 521, and both ends of each external arm part 521 are coupled to a connecting arm part 523, and each connecting arm part 523 is coupled to an induced magnetic part 527, 529, and the induced magnetic parts 527, 529 are arranged into a circular ring shape.

Figure 7:
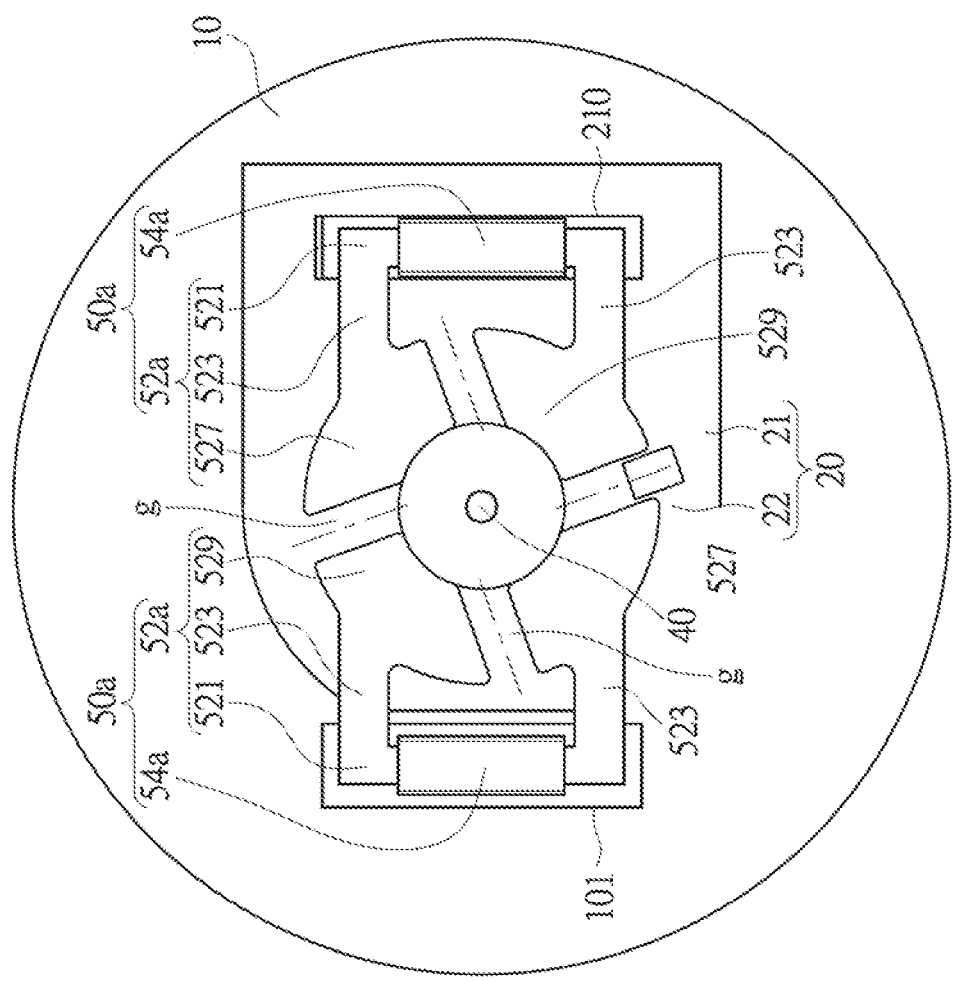
FIG. 7 is a top view of a stator motor in accordance with the second preferred embodiment of the present invention.

With reference to FIG. 7 for a schematic view of a stator motor with a permanent magnet removed from the stator motor as depicted in FIG. 6, a separating groove g is formed between any two adjacent induced magnetic parts 527, 529 of the stator module 50a which are arranged into a circular ring shape in accordance with this preferred embodiment, and an included angle is defined between the separating grooves g and the diameter of the spindle 40. With the aforementioned oblique separating grooves g, this preferred embodiment can prevent the rotor module from getting stuck at a dead point.

Figure 8:
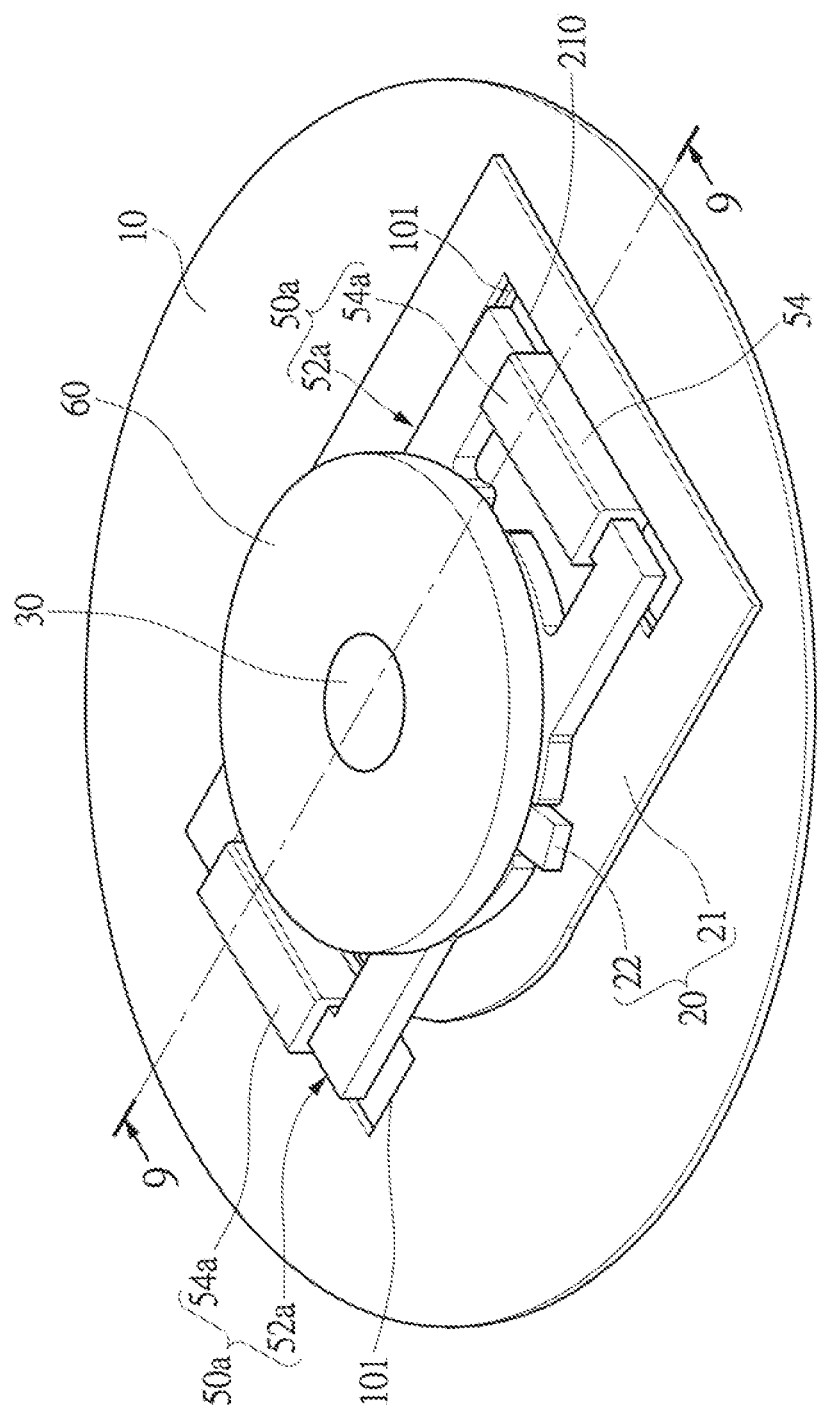
FIG. 8 is a perspective view of a thin axial gap motor in accordance with the second preferred embodiment of the present invention.
Figure 9:
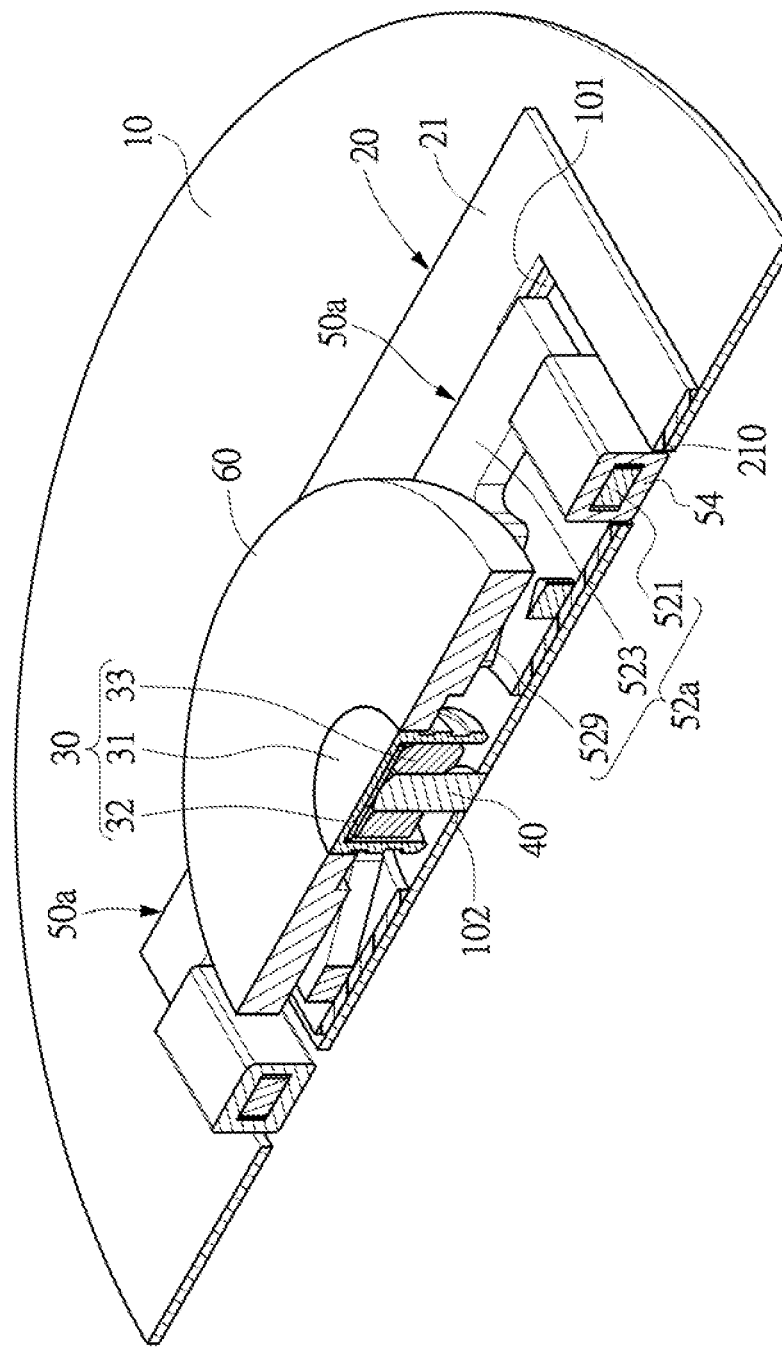
FIG. 9 is a perspective sectional view of Section 9-9 of FIG. 8.
Figure 10:
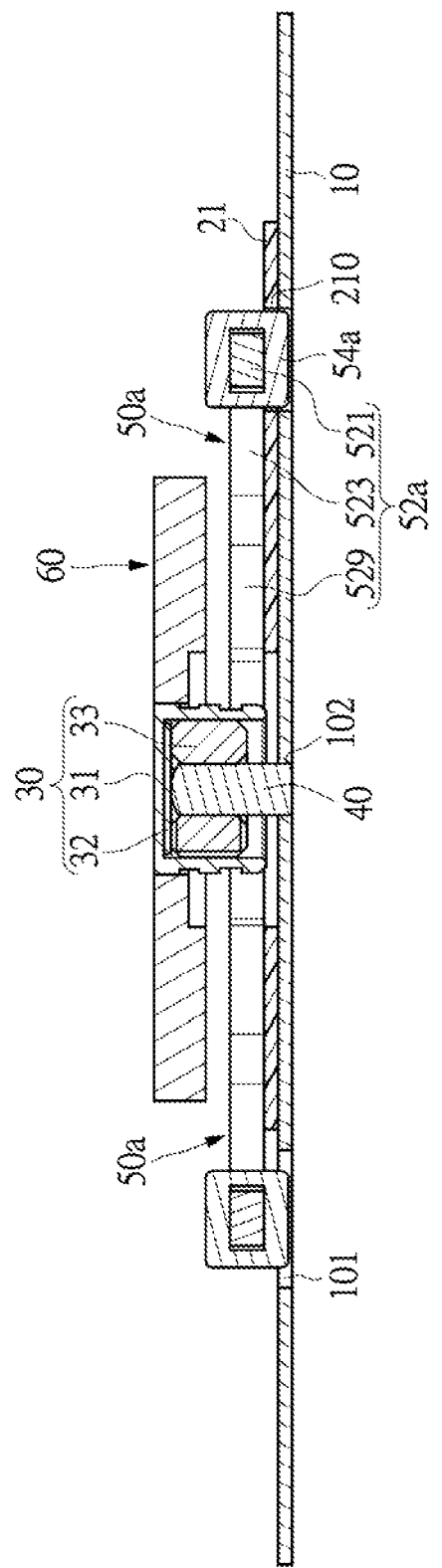
FIG. 10 is a planar view of FIG. 9.

With reference to FIGS. 8, 9 and 10 for a perspective view of a thin axial gap motor, and a perspective sectional view of Section 9-9 of FIG. 8, and a planar view of FIG. 8 respectively, the bearing housing 30 includes a shaft tube 31, a spacer 32 installed at the top of the shaft tube 31, and a bearing 33. The spindle 40 has an end (bottom end) soldered to the base 10 and the other end (top end) abutting the spacer 32.

Third Preferred Embodiment

Figure 11:
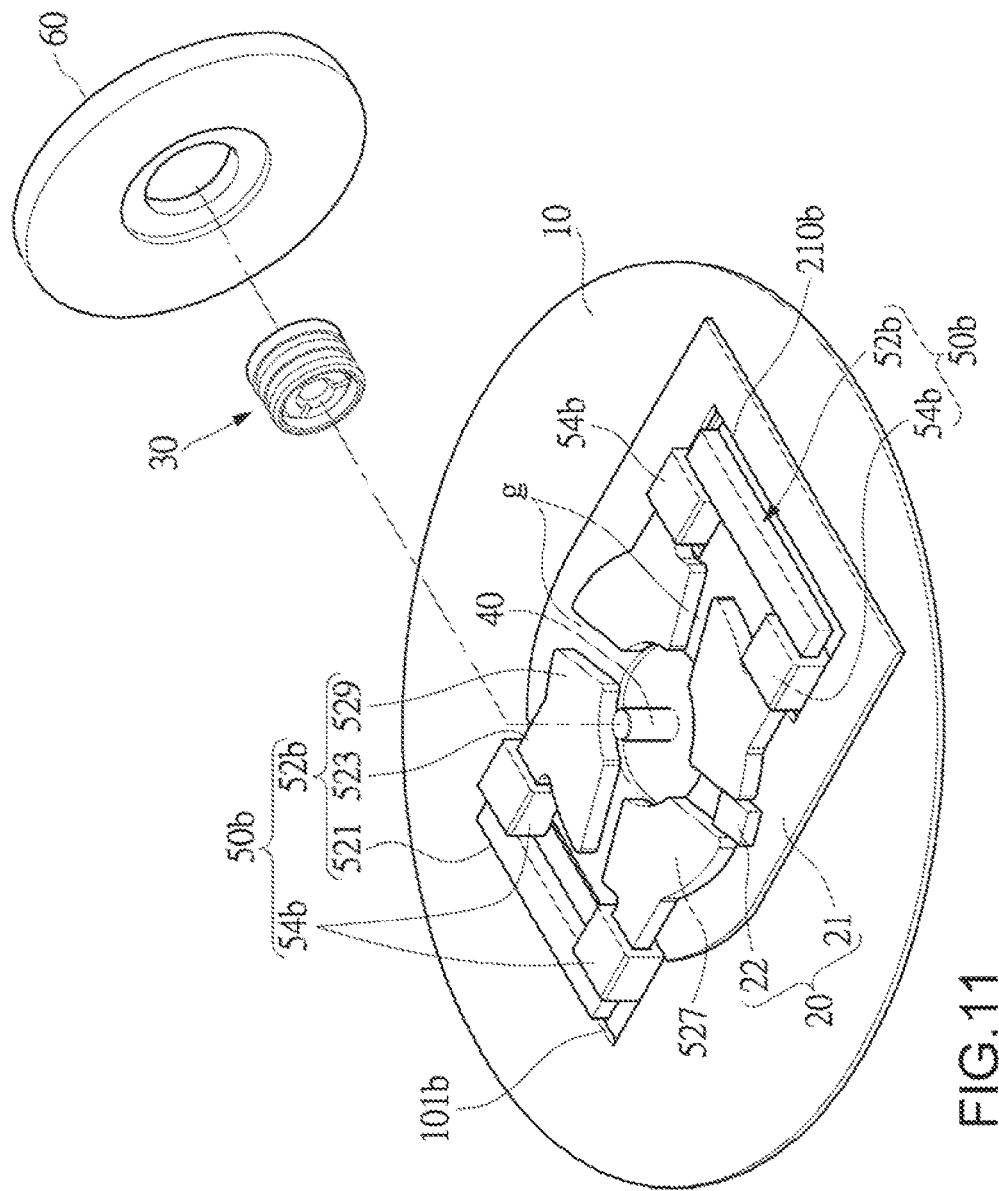
FIG. 11 is an exploded view of a thin axial gap motor in accordance with a third preferred embodiment of the present invention.
Figure 12:
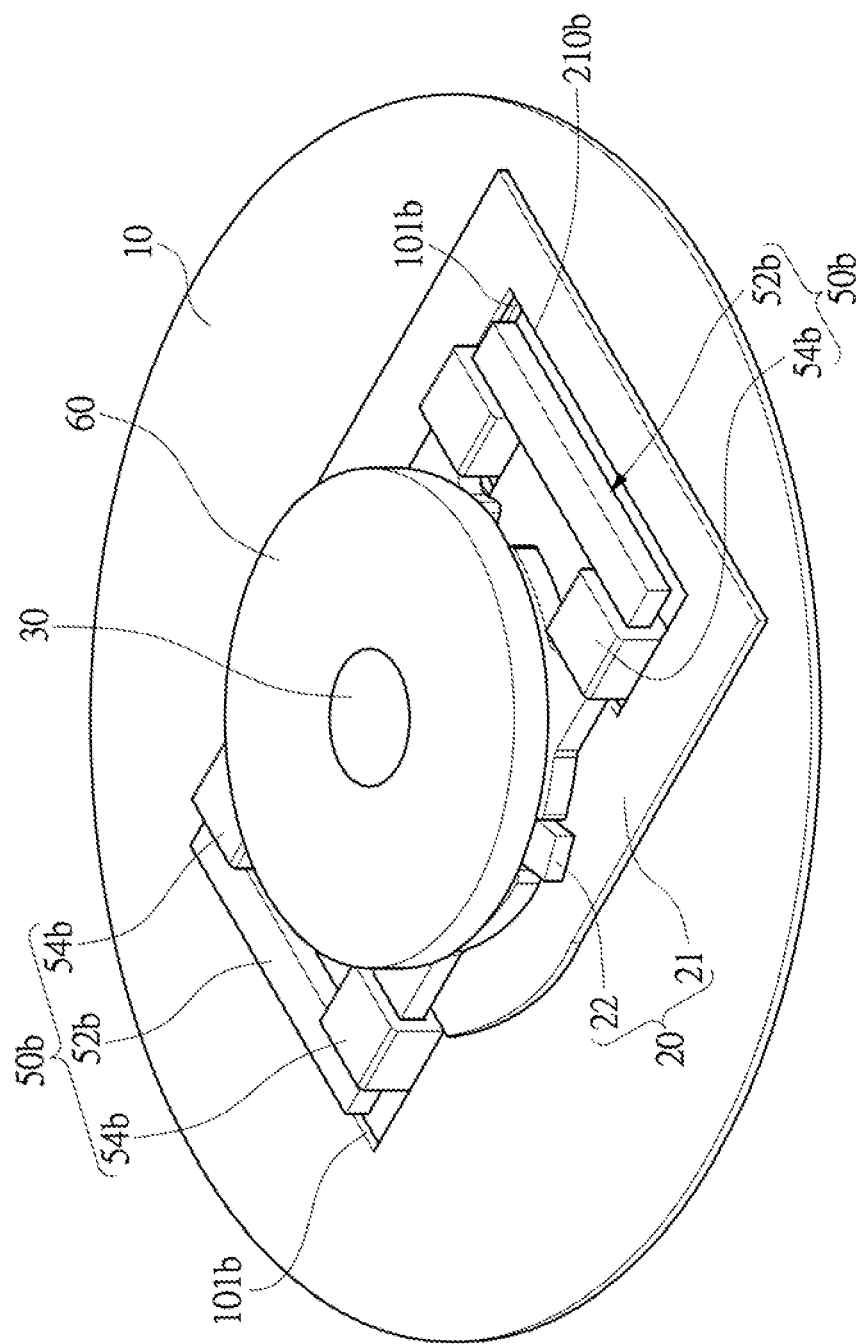
FIG. 12 is a perspective view of a thin axial gap motor in accordance with the third preferred embodiment of the present invention.

With reference to FIGS. 11 and 12 for a perspective exploded view and a planar sectional view of a thin axial gap motor in accordance with the third preferred embodiment of the present invention respectively, the difference between this preferred embodiment and the second preferred embodiment resides on that each permeable frame 52b of the stator module 50b includes two substantially straight external arm parts 521 installed opposite to each other, and a connecting arm part 523 is coupled separately to both ends of each external arm part 521, and a winding 54b is wound around each connecting arm part 523, and each connecting arm part 523 is coupled to an induced magnetic part 527, 529, and the plurality of induced magnetic parts 527, 529 are arranged into a circular ring shape.

To further reduce the height of the motor, a wire containing hole 210b is formed on the circuit board 21 of the circuit unit 20 for accommodating a part of the winding 54b. In addition, an opening 101b is formed on the base 10 and configured to be corresponsive to the wire containing hole 210b, and a part of the winding 54b is disposed in the opening 101b.

In this preferred embodiment, a separating groove g is formed between any two adjacent induced magnetic parts 527, 529 of the stator module 50b which are arranged into a circular ring shape in accordance with this preferred embodiment, and an included angle is defined between the separating grooves g and the diameter of the spindle 40. With the aforementioned oblique separating grooves g, uneven air gaps are formed to prevent the rotor module from getting stuck at a dead point. When the motor is situated at a dead point, the toque is exactly equal to zero. Now, if the motor bears a load with friction, the motor will get stuck at the dead point and cannot be started again.

Fourth Preferred Embodiment

Figure 13:
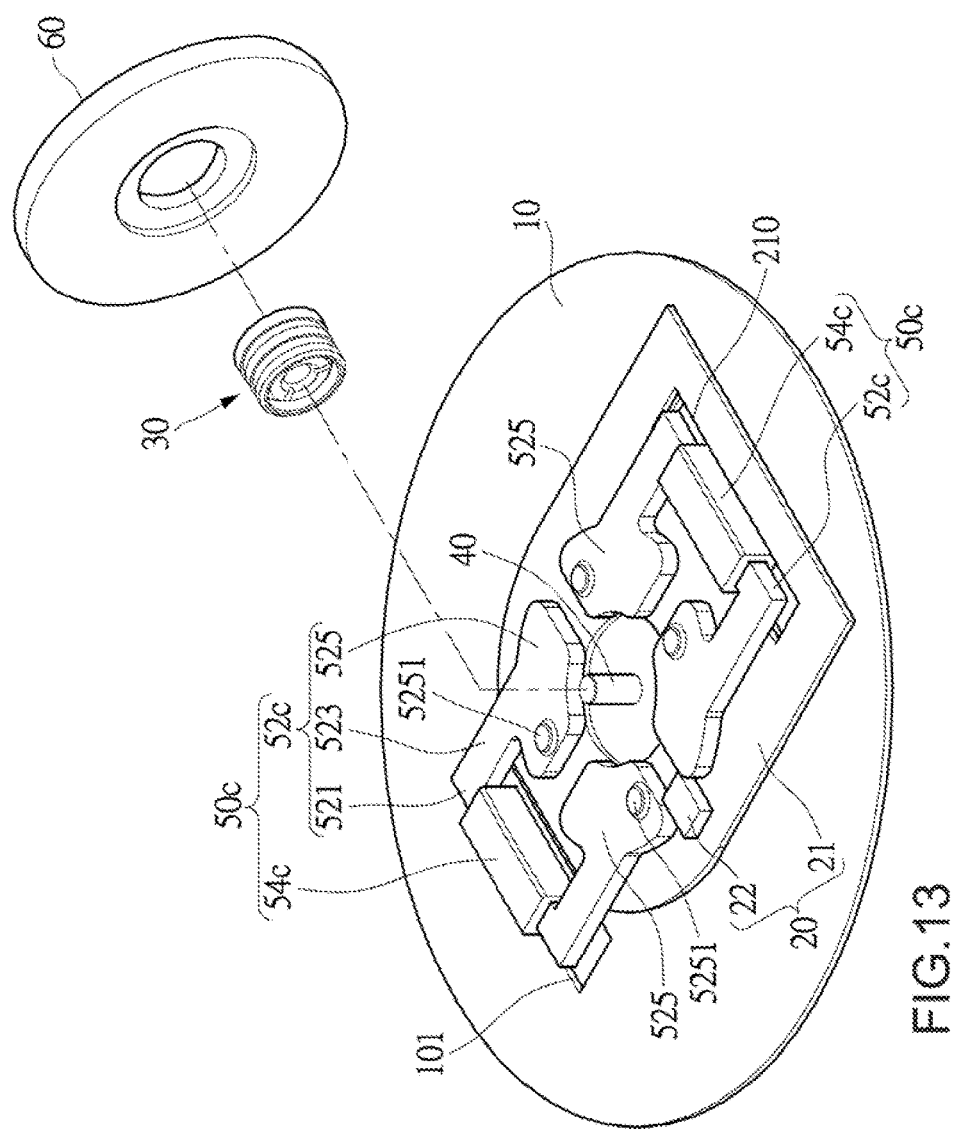
FIG. 13 is a perspective exploded view of a thin axial gap motor in accordance with a fourth preferred embodiment of the present invention.
Figure 14:
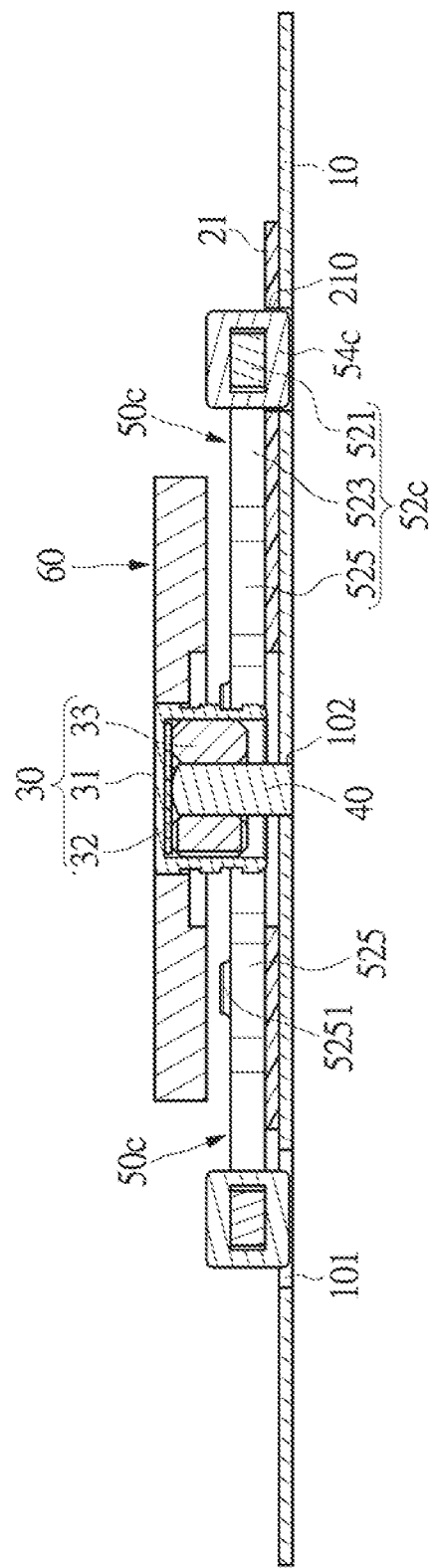
FIG. 14 is a planar sectional view of a thin axial gap motor in accordance with the fourth preferred embodiment of the present invention.

With reference to FIGS. 13 and 14 for a perspective exploded view and a planar sectional view of a thin axial gap motor in accordance with the fourth preferred embodiment of the present invention respectively, the difference between this preferred embodiment and the third preferred embodiment resides on that each permeable frame 52c of the stator module 50c includes two substantially straight external arm parts 521 installed opposite to each other, and a connecting arm part 523 is coupled separately to both ends of each external arm part 521, and a winding 54c is wound around each external arm part 521, and an induced magnetic part 525 is coupled to each connecting arm part 523, and the plurality of induced magnetic parts 525 are arranged into a circular ring shape. Wherein, a magnetic field changing part 5251 is formed on a surface of each induced magnetic part 525. In this preferred embodiment, the magnetic field changing part 5251 is protruded upwardly from the top of the induced magnetic part 525 to form a protrusion provided for preventing the rotor module from getting stuck at a dead point.

Fifth Preferred Embodiment

Figure 15:
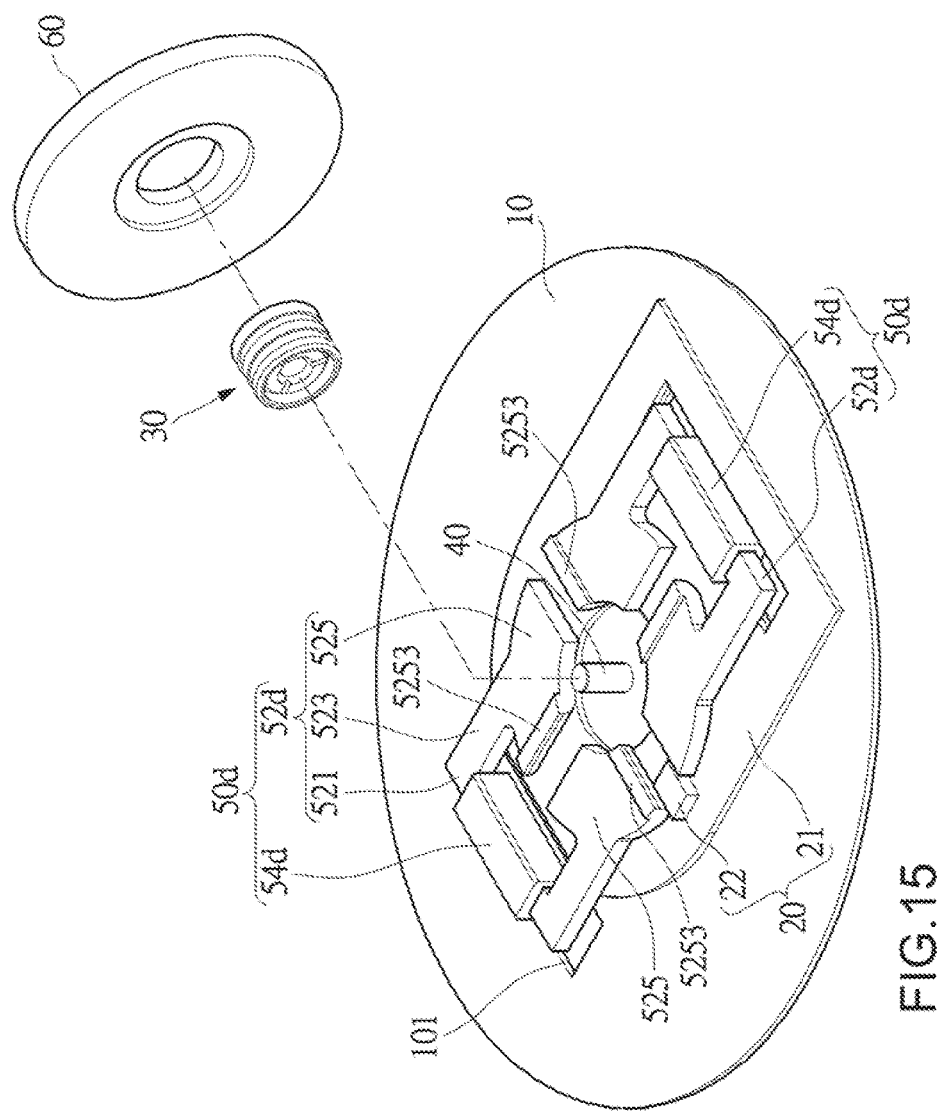
FIG. 15 is a perspective exploded view of a thin axial gap motor in accordance with a fifth preferred embodiment of the present invention.
Figure 16:
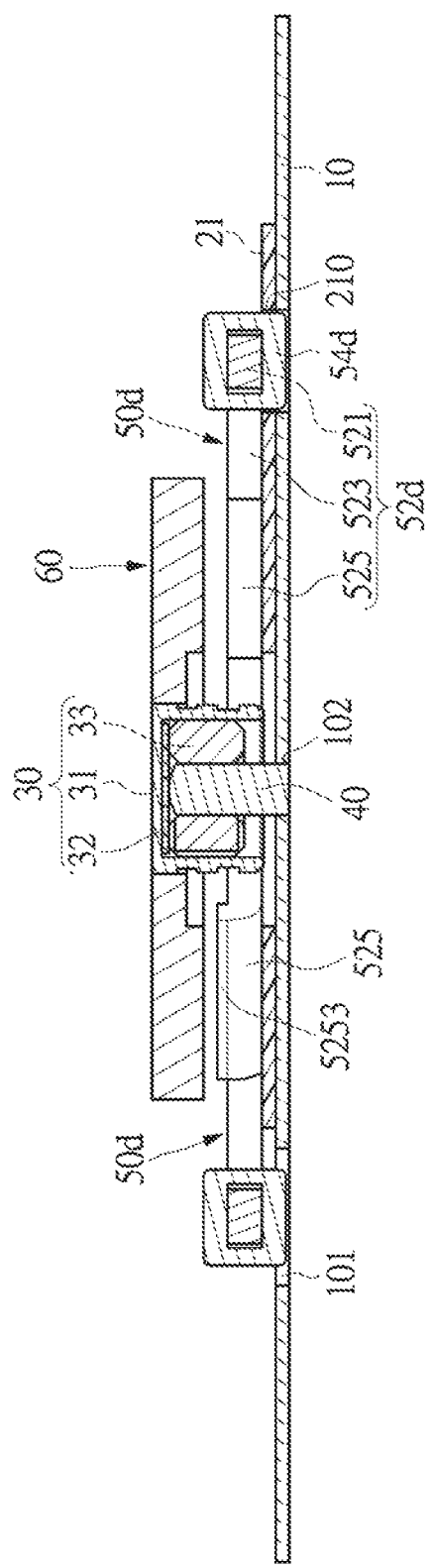
FIG. 16 is a planar sectional view of a thin axial gap motor in accordance with the fifth preferred embodiment of the present invention.

With reference to FIGS. 15 and 16 for a perspective exploded view and a planar sectional view of a thin axial gap motor in accordance with the fourth preferred embodiment of the present invention respectively, each permeable frame 52d of the stator module 50d includes two substantially straight external arm parts 521 installed opposite to each other, and a connecting arm part 523 is coupled separately to both ends of each external arm part 521, and a winding 54d is wound around each external arm part 521, and an induced magnetic part 525 is coupled to each connecting arm part 523, and the plurality of induced magnetic parts 525 are arranged into a circular ring shape. Wherein, a magnetic field changing part 5253 is formed by bending an edge of each induced magnetic part 525 upwardly in an axial direction. Therefore, the air gap between the permeable frame 52d and the permanent magnet 60 may be reduced, and the rotating angle of the rotor module may be changed to prevent the rotor module from getting stuck at a dead point.

Sixth Preferred Embodiment

Figure 17:
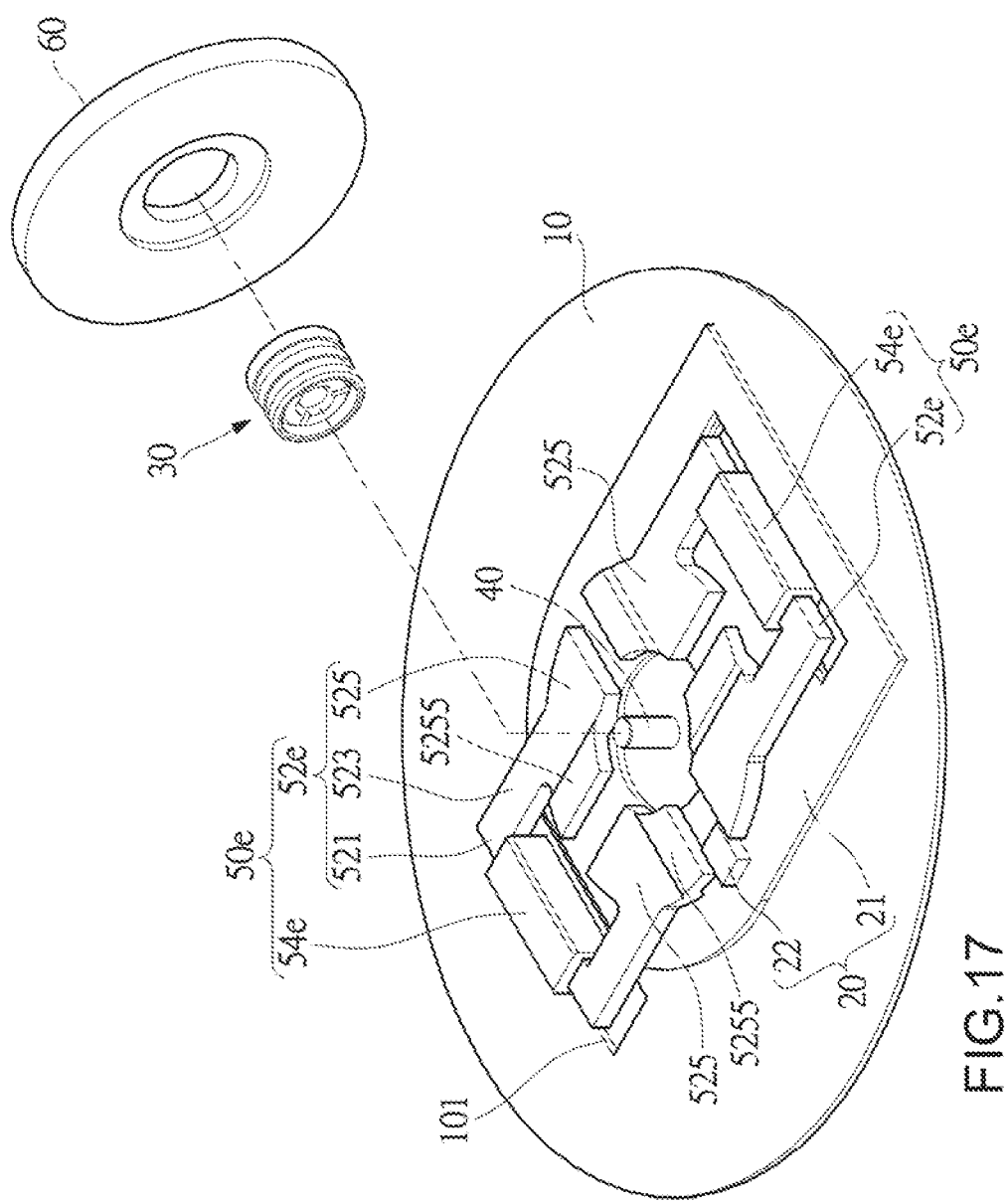
FIG. 17 is a perspective exploded view of a thin axial gap motor in accordance with a sixth preferred embodiment of the present invention.
Figure 18:
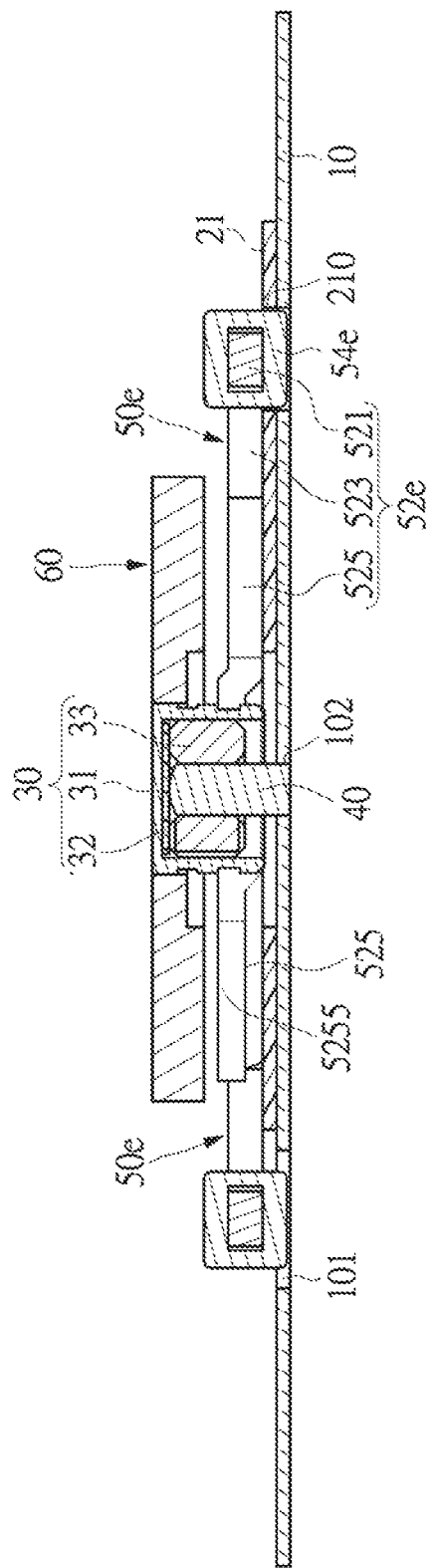
FIG. 18 is a planar sectional view of a thin axial gap motor in accordance with the sixth preferred embodiment of the present invention.

With reference to FIGS. 17 and 18 for a perspective exploded view and a planar sectional view of a thin axial gap motor in accordance with the sixth preferred embodiment of the present invention respectively, each permeable frame 52e of the stator module 50e includes two substantially straight external arm parts 521 installed opposite to each other, and a connecting arm part 523 is coupled separately to both ends of each external arm part 521, and a winding 54e is wound around each external arm part 521, and an induced magnetic part 525 is coupled to each connecting arm part 523, and the plurality of induced magnetic parts 525 are arranged into a circular ring shape. Wherein, a magnetic field changing part 5255 is formed by upwardly bending an edge of each induced magnetic part 525 in an axial direction and horizontally extended. Therefore, the air gap between the permeable frame 52e and the permanent magnet 60 may be reduced, and the rotating angle of the rotor module may be changed to prevent the rotor module from getting stuck at a dead point.

The magnetic field changing part of the foregoing preferred embodiment may be formed by bending a part of the induced magnetic part by a punching method, but the present invention is not limited to such method only. For example, the induced magnetic part is partially protruded from the top, as long as the air gap between the permeable frame and the permanent magnet is uneven in the axial direction, so that the rotating angle of the rotor module may be changed to avoid the issue of having a dead point at the startup.

Compared with the conventional "※" shaped silicon steel plates with the winding, this preferred embodiment reduces the height occupied by the winding or even the height occupied by the circuit board to provide a thin design of the motor. The induced magnetic parts may cover the magnetic field of the permanent magnet, so that the motor of this preferred embodiment no longer requires the installation or use of back iron. In addition, the magnetic field changing part can form the flat permeable frames of the present invention easily and prevent the rotor module from getting stuck at a dead point. Therefore, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A thin axial gap motor, comprising:
a base;
a circuit unit, installed on the base;
a stator module, including at least one flat permeable frame and at least one winding, and the permeable frame having at least one support arm and a plurality of induced magnetic parts coupled to the at least one support arm, and the winding being wound around the support arm;
a rotor module being rotatable relative to the stator module, including a flat permanent magnet installed at the top of the plurality of induced magnetic parts along a rotating axis between the rotor module and the stator module, and the permanent magnet having an orthographic projection range, and the orthographic projection range being along the rotating axis between the rotor module and the stator module and corresponsive to the area of the induced magnetic parts, and the at least one winding being situated on an external side of the permanent magnet; and
a pivoting element, installed between the base and the rotor module, and including a bearing housing and a spindle plugged into the bearing housing for rotating the rotor module with respect to the base;
wherein the support arm is substantially U-shaped and includes an external arm part and a pair of connecting arm parts, and one of the ends of each connecting arm part is coupled to both ends of the external arm part, and the other end of each connecting arm part is coupled to one of the induced magnetic parts;
wherein each external arm part has a winding wound around the external arm part, and the plurality of induced magnetic parts are arranged into a circular ring shape, and each permanent magnet is in a circular ring shape.

2. A thin axial gap motor, comprising:
a base;
a circuit unit, installed on the base;
a stator module, including at least one flat permeable frame and at least one winding, and the permeable frame having at least one support arm and a plurality of induced magnetic parts coupled to the at least one support arm, and the winding being wound around the support arm;
a rotor module being rotatable relative to the stator module, including a flat permanent magnet installed at the top of the plurality of induced magnetic parts along a rotating axis between the rotor module and the stator module, and the permanent magnet having an orthographic projection range, and the orthographic projection range being along the rotating axis between the rotor module and the stator module and corresponsive to the area of the induced magnetic parts, and the at least one winding being situated on an external side of the permanent magnet; and
a pivoting element, installed between the base and the rotor module, and including a bearing housing and a spindle plugged into the bearing housing for rotating the rotor module with respect to the base;
wherein the support arm is substantially U-shaped and includes an external arm part and a pair of connecting arm parts, and one of the ends of each connecting arm part is coupled to both ends of the external arm part, and the other end of each connecting arm part is coupled to one of the induced magnetic parts;
wherein the winding is wound around each respective connecting arm part, and the plurality of induced magnetic parts are arranged into a circular ring shape, and each permanent magnet is in a circular ring shape.

3. The thin axial gap motor of claim 1, wherein the bearing housing is fixed to the center of the permanent magnet, and the base has an axial hole formed thereon, and the bottom of the spindle is soldered and fixed to the axial hole, and the bearing housing is installed upside down and sheathed on the spindle.

4. The thin axial gap motor of claim 1, wherein the circuit unit includes a circuit board, and at least one electronic component installed on the circuit board, and the stator module is installed on the circuit board of the circuit unit, and the circuit board has a wire containing hole formed thereon for receiving a part of the winding.

5. The thin axial gap motor of claim 4, wherein the base has an opening formed thereon and configured to be corresponsive to the wire containing hole, and a part of the winding is disposed in the opening.

6. The thin axial gap motor of claim 1, wherein the stator module includes a plurality of induced magnetic parts arranged into a circular ring shape, and a separating groove is formed between two of the adjacent induced magnetic parts, and an included angle is defined between the plurality of separating grooves and the diameter of the spindle.

7. The thin axial gap motor of claim 1, wherein the stator module includes a plurality of induced magnetic parts arranged into a circular ring shape, and a magnetic field changing part is formed on a surface of each induced magnetic part.

8. The thin axial gap motor of claim 7, wherein the magnetic field changing part is formed by bending an edge of the induced magnetic part upwardly.

9. The thin axial gap motor of claim 7, wherein the magnetic field changing part is formed by punching the top of the induced magnetic part upwardly.

10. The thin axial gap motor of claim 2, wherein the bearing housing is fixed to the center of the permanent magnet, and the base has an axial hole formed thereon, and the bottom of the spindle is soldered and fixed to the axial hole, and the bearing housing is installed upside down and sheathed on the spindle.

* * * * *